United States Patent
Friggstad

(10) Patent No.: US 10,104,828 B2
(45) Date of Patent: Oct. 23, 2018

(54) AGRICULTURAL IMPLEMENT SYSTEM WITH TOOL BAR BEHIND WING FRAME

(71) Applicant: CNH Industrial Canada, Ltd., Saskatoon (CA)

(72) Inventor: Terrance Alan Friggstad, Grasswood (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 34 days.

(21) Appl. No.: 15/342,659

(22) Filed: Nov. 3, 2016

(65) Prior Publication Data

US 2017/0118903 A1    May 4, 2017

Related U.S. Application Data

(60) Provisional application No. 62/250,258, filed on Nov. 3, 2015.

(51) Int. Cl.
*A01B 73/06* (2006.01)
*A01C 7/08* (2006.01)
(Continued)

(52) U.S. Cl.
CPC .......... *A01B 73/048* (2013.01); *A01B 73/067* (2013.01); *A01C 7/208* (2013.01); *A01C 7/08* (2013.01)

(58) Field of Classification Search
CPC ..... A01B 73/06; A01B 73/067; A01B 73/048; A01B 7/062; A01C 7/208; A01C 7/08
(Continued)

(56) References Cited

U.S. PATENT DOCUMENTS

| | | | | | |
|---|---|---|---|---|---|
| 2,787,477 | A | * | 4/1957 | Melroe | A01B 39/24 172/311 |
| 4,066,274 | A | * | 1/1978 | Adee | A01B 73/062 172/311 |

(Continued)

FOREIGN PATENT DOCUMENTS

| | | | | | |
|---|---|---|---|---|---|
| CA | 2938405 | A1 | * | 2/2017 | ........... B62D 63/062 |
| EP | 1493322 | A1 | * | 1/2005 | ........... A01B 73/067 |
| WO | WO-2014019586 | A1 | * | 2/2014 | ........... A01B 73/067 |

OTHER PUBLICATIONS

U.S. Appl. No. 15/342,577, filed Nov. 3, 2016, Friggstad.

*Primary Examiner* — John Weiss
(74) *Attorney, Agent, or Firm* — Rebecca L. Henkel; Rickard K. DeMille

(57) ABSTRACT

An agricultural implement system including a hitch assembly configured to couple to a tow vehicle, a plurality of wing tool bars coupled transversely to the hitch assembly, and a plurality of wing frames pivotally coupled to the plurality of wing tool bars Each wing frame is configured to support a plurality of row units and is positioned forward of a respective wing tool bar. The agricultural implement system further includes an air cart support arm with a first and second end. The first end of the air cart support arm is pivotally coupled to the wing tool bar and the second end of the air cart support arm is configured to couple to an air cart and the air cart support arm is configured to drive the air cart in a rearward direction relative to the hitch assembly in response to rotation of the wing tool bar in the rearward direction.

17 Claims, 16 Drawing Sheets

(51) Int. Cl.
    *A01B 73/04*     (2006.01)
    *A01C 7/20*     (2006.01)

(58) Field of Classification Search
    USPC .................. 172/310, 311, 318, 319, 452
    See application file for complete search history.

(56) References Cited

U.S. PATENT DOCUMENTS

| | | | | |
|---|---|---|---|---|
| 4,360,215 | A * | 11/1982 | Nohl | A01B 73/067 172/240 |
| 8,727,032 | B2 * | 5/2014 | Friggstad | A01B 73/065 172/311 |
| 9,198,342 | B2 | 12/2015 | Friggstad | |
| 9,320,190 | B2 * | 4/2016 | Sauder | A01B 63/145 |
| 9,795,071 | B2 * | 10/2017 | Friggstad | A01B 49/06 |
| 2015/0047312 | A1 * | 2/2015 | Graham | A01B 73/065 56/396 |
| 2015/0296700 | A1 * | 10/2015 | Redekop | A01B 73/067 172/667 |
| 2017/0354084 | A1 * | 12/2017 | Hofmann | A01B 73/067 |

\* cited by examiner

AGRICULTURAL IMPLEMENT SYSTEM WITH TOOL BAR BEHIND WING FRAME

CROSS REFERENCE TO RELATED APPLICATION

This application claims priority from and the benefit of U.S. Provisional Application Ser. No. 62/250,258, entitled "CULTIVATOR/DRILL AND LARGER HOE AND PRECISION DRILL", filed Nov. 3, 2015, which is hereby incorporated by reference in its entirety.

BACKGROUND

The present disclosure relates generally to an agricultural implement system with a tool bar behind a wing frame.

A range of agricultural implements have been developed and are presently in use for tilling, planting, harvesting, and so forth. Seeders, for example, are commonly towed behind tractors, or other work vehicles, and may cover wide swaths of soil which may be tilled or untilled. Such devices typically open the soil, dispense seeds in the soil openings, and close the soil as the implement traverses a field. In seeders, seeds are commonly dispensed from bulk seed tanks and distributed to row units by a distribution system. To enhance the efficiency of planting operations, very wide swaths of soil may be covered by wings extending on either side of a central tool bar section of the implement. Generally included in the wing assemblies are tool bars, tool frames, and row units. Certain wing assemblies are configured to fold rearwardly or forwardly for transport. In such configurations, tool frames coupled to each wing tool bar may first fold upwardly for transport. The wing assemblies may then fold rearwardly or forwardly. This arrangement provides a compact profile for transport. Because the tool bars are typically disposed in front of the tool frames, the row units may be at least partially driven out of the ground, thereby reducing the efficiency of the seeding process.

In addition, certain implements are designed to tow an air cart that provides product (e.g. seeds, fertilizer, etc.) pneumatically to the implement. However, the air cart may be positioned behind the hitch assembly by a sufficient distance that enables the wing assemblies to fold rearwardly without contacting the air cart. Unfortunately, positioning the air cart a significant distance behind the hitch reduces the efficiency of the product transfer process because the lines that provide the product experience a pressure drop as they increase in length.

BRIEF DESCRIPTION

In one embodiment, an agricultural implement system is provided including a a center frame comprising a center bar, a first wing frame comprising a wing bar and the first wing frame is configured to rotate about a vertical axis relative to the center frame, and a locking mechanism that is configured to lock the center bar to the wing bar and the locking mechanism is configured to unlock the center bar from the wing bar to facilitate rotation of the first wing frame about the vertical axis relative to the center frame.

In an alternative embodiment, an agricultural implement system is provided including a center frame comprising a center bar, a first wing frame comprising a first wing bar and the first wing frame is configured to rotate about a vertical axis relative to the center frame, a second wing frame comprising a second wing bar and the second wing frame is configured to rotate about a vertical axis relative to the center frame, and the first wing frame and second wing frame are disposed on opposite lateral sides of the center frame, a first locking mechanism that is configured to lock the center bar to the first wing bar and the first locking mechanism is configured to unlock the center bar from the first wing bar to facilitate rotation of the first wing frame about the vertical axis relative to the center frame, and a second locking mechanism that is configured to lock the center bar to the second wing bar and the second locking mechanism is configured to unlock the center bar from the first wing bar to facilitate rotation of the first wing frame about the vertical axis relative to the center frame.

In another embodiment, an agricultural implement system is provided including a center frame comprising a center bar, a first wing frame comprising a wing bar and the first wing frame is configured to rotate about a vertical axis relative to the center frame, and a locking mechanism that is configured to lock the center bar to the wing bar and the locking mechanism is configured to unlock the center bar from the wing bar to facilitate rotation of the first wing frame about the vertical axis relative to the center frame. In addition, the center bar is the most forward member of the center frame relative to the direction of travel and the wing bar is the most forward member of the first wing frame relative to the direction of travel.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
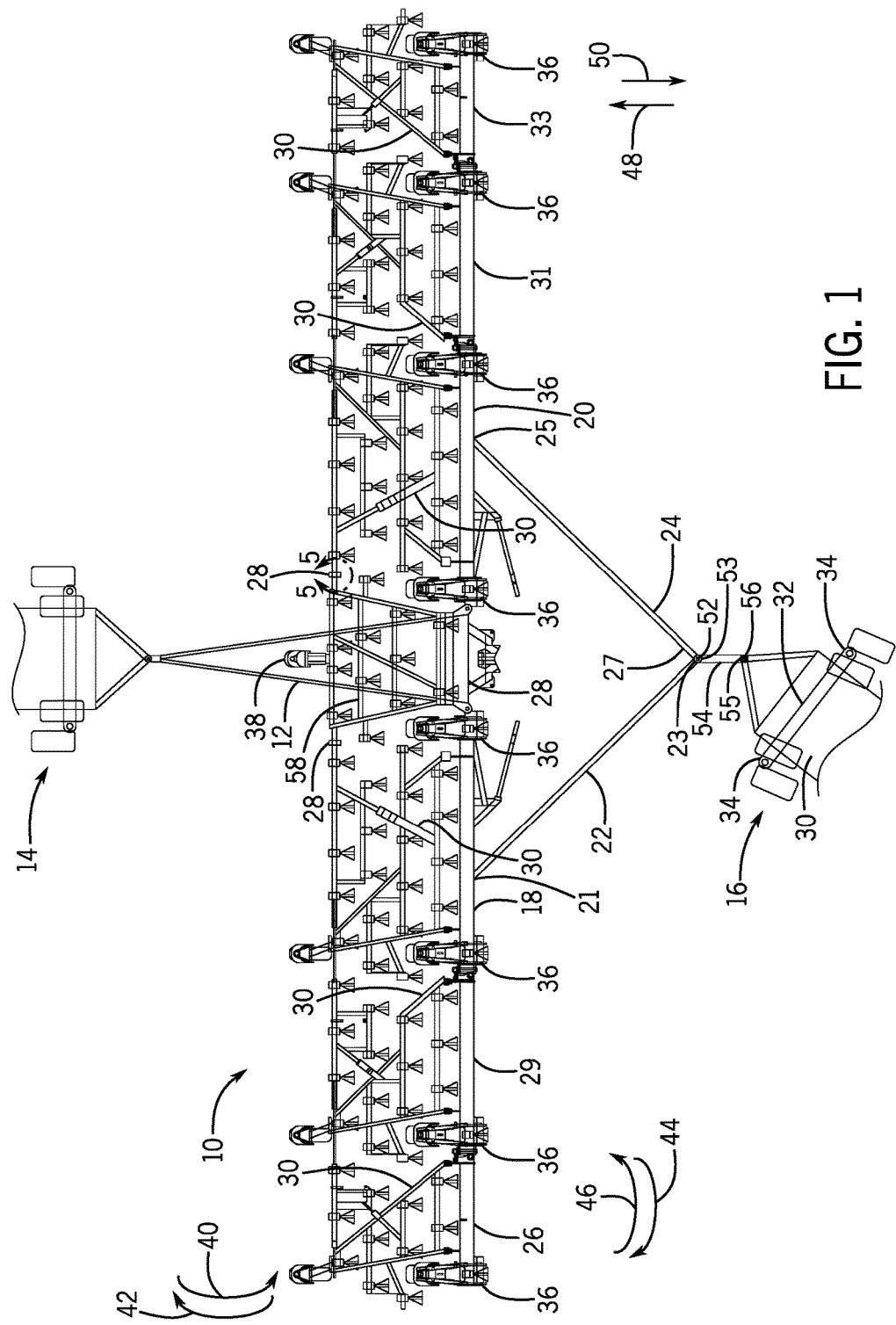
FIG. 1 is a top view of an embodiment of a folding implement in a working position, in which wing tool bars are positioned behind wing frames.

FIG. 1 is a top view of an embodiment of a folding implement 10 in a working position, in which wing tool bars are positioned behind wing frames 30. In the illustrated embodiment, the implement 10 includes a hitch assembly 12 coupled to a center tool bar 28. The hitch assembly 12 is connected to a tow vehicle 14, such as a tractor or other work vehicle, thereby enabling the tow vehicle 14 to pull the implement 10 through a field. A first cart support arm 22 is pivotally coupled at a first end 21 to a first wing tool bar 18, and a second cart support arm 24 is pivotally coupled at a first end 25 to a second wing tool bar 20. However, it should be appreciated that the first end 21 of the first cart support arm 22 and/or the first end 25 of the second cart support arm 24 may be coupled to any suitable point of the tool bars, including the first wing tool bar 18, the second wing tool bar 20, the additional wing tool bars 26, 29, 31, and 33, or a center tool bar 28. In the illustrated embodiment, the second end 23 of the first cart support arm 22 and the second end 27 of the second cart support arm 24 are pivotally coupled to one another at joint 52. A first end 53 of a cart arm 54 is pivotally coupled to the first cart support arm 22 and the second cart support arm 24 at joint 52 and the second end 55 of the cart arm 54 is pivotally coupled to the cart 16 at joint 56. However, cart arm 54 may be omitted in certain embodiments. In this configuration, the cart 16 follows the implement 10 as the implement 10 is pulled through the field.

The first wing tool bar 18 and the second wing tool bar 20 pivotally couple to the center tool bar 28 on opposite lateral sides of the center tool bar 28. The first wing tool bar 18 and the second wing tool bar 20 are configured to rotate rearwardly from the illustrated working position to a folded transport position. Wing frames 30 are coupled to each of the wing tool bars. As illustrated, all of the wing tool bars are positioned behind the wing frames 30 relative to a direction of travel 48 (e.g., the direction of travel of the implement 10 through the field while depositing product into the soil). Accordingly, the tow vehicle 14 pulls the wing tool bars following behind the wing frames 30, which causes the wing tool bars to provide additional torque to the wing frames 30, thereby driving ground engaging tools (e.g., within row units coupled to the wing frames 30) into the soil to facilitate enhanced product delivery. In addition, with the wing frames 30 positioned closer to the tow vehicle, an operator of the tow vehicle may have enhanced visibility of the operational components of the wing frames 30 (e.g., row units, hydraulic assemblies, etc.). Components of the hitch assembly 12, the wing tool bars, and wing frames 30 may be made of any suitable material, such as steel.

Although the illustrated implement includes six wing tool bars and wing frames 30 certain implements may have fewer or more wing tool bars and wing frames. The number of wing tool bars and wing frames may be based partially on the desired width of wings on each side of the implement 10. For example, one embodiment may include wings of approximately 50 feet on each side of the hitch assembly 12.

In the certain embodiments, the implement 10 includes wing frame actuators configured to rotate the wing frames 30 in an upward direction 40 to transition the wing frames 30 from the illustrated working position to a folded transport position. For example, hydraulic pressure may be applied to the actuators, causing a retraction of a piston rod and urging the wing frames 30 to rotate in the upward direction 40. With the wing frames 30 in the folded position, row units that may be attached to the wing frames 30 disengage the soil, thereby facilitating transport of the implement 10. In addition, a flow of product (e.g., seeds, fertilizer, etc.) to ground engaging tools attached to the row units may be temporarily suspended while the wing frames 30 are in the folded position. Furthermore, with the wing frames 30 in the folded position, the wing tool bars provide structural support to hold the wing frames 30 in the folded position. Although the present embodiment shows hydraulic actuators, the actuators could be driven by other means, such as pneumatics, electromechanics, etc.

In addition, the wing frames 30 may be transitioned to the working position by applying hydraulic pressure to the actuators causing an extension of the piston rods thereby driving the wing frames 30 to rotate in a downward direction 42. With the wing frames 30 in the illustrated working position, ground engaging tools of the row units may engage the soil, thereby facilitating seed deposition into the soil. During operation, the ground engaging tools create drag that urges the wing frames 30 in a rearward direction 44. Further, each wing frame 30 is connected to one another at joints along the wing tool bars and the drag urges the wing frames to fold at these joints. Therefore, the illustrated embodiment includes locking mechanisms 28 and telescoping mechanisms 140 to block the wing frames 30 from folding in the rearward direction 44.

Locking mechanisms 28 are located on the wing frames 30 to block rearward rotation of the wing frames 30 and wing tool bars. Functionally, the locking mechanisms 28 are configured to be locked while in the implement 10 is in the working position, and to be unlocked while the wing frames 30 of implement 10 are folded in the upward direction in the folded transport position. In addition, the locking mechanisms 28 block the wing frames 30 and the wing tool bars from folding in the rearward direction 44 when the work vehicle 14 pulls the implement 10 in the direction of travel 48.

The cart 16 is attached to the first wing tool bar 18 and the second wing tool bar 20 via the first cart support arm 22, the second cart support arm 24, and the cart arm 54. The cart 16 includes a storage tank 30, a frame 32, and wheel assemblies 34. In certain configurations, the storage tank 30 includes multiple compartments for storing various flowable particulate materials. For example, one compartment may include seeds, and another compartment may include a dry fertilizer. In such configurations, the cart 16 is configured to deliver both the seeds and fertilizer to the implement 10. In the illustrated embodiment, the wheel assemblies 34 are rotatable relative to the frame 32. In alternative embodiments, the cart 16 may include fewer or more wheel assemblies. In the illustrated embodiment, the cart 16 is shown as it may appear when a tow vehicle is making a left turn. The wheel assemblies 34 are shown turned to the left, and the cart 16 is depicted as if it were being turned behind the implement 10. Furthermore, the cart 16 may be an air cart, or any other cart that may be towed behind the implement 10. In certain embodiments, the implement does not include a center frame or a center tool bar. Further, without a center frame or a center tool bar, the wing tool bars may be rotatably coupled to one another by a center joint that enables the wing tool bars to pivot about a longitudinal axis relative to one another.

Figure 2:
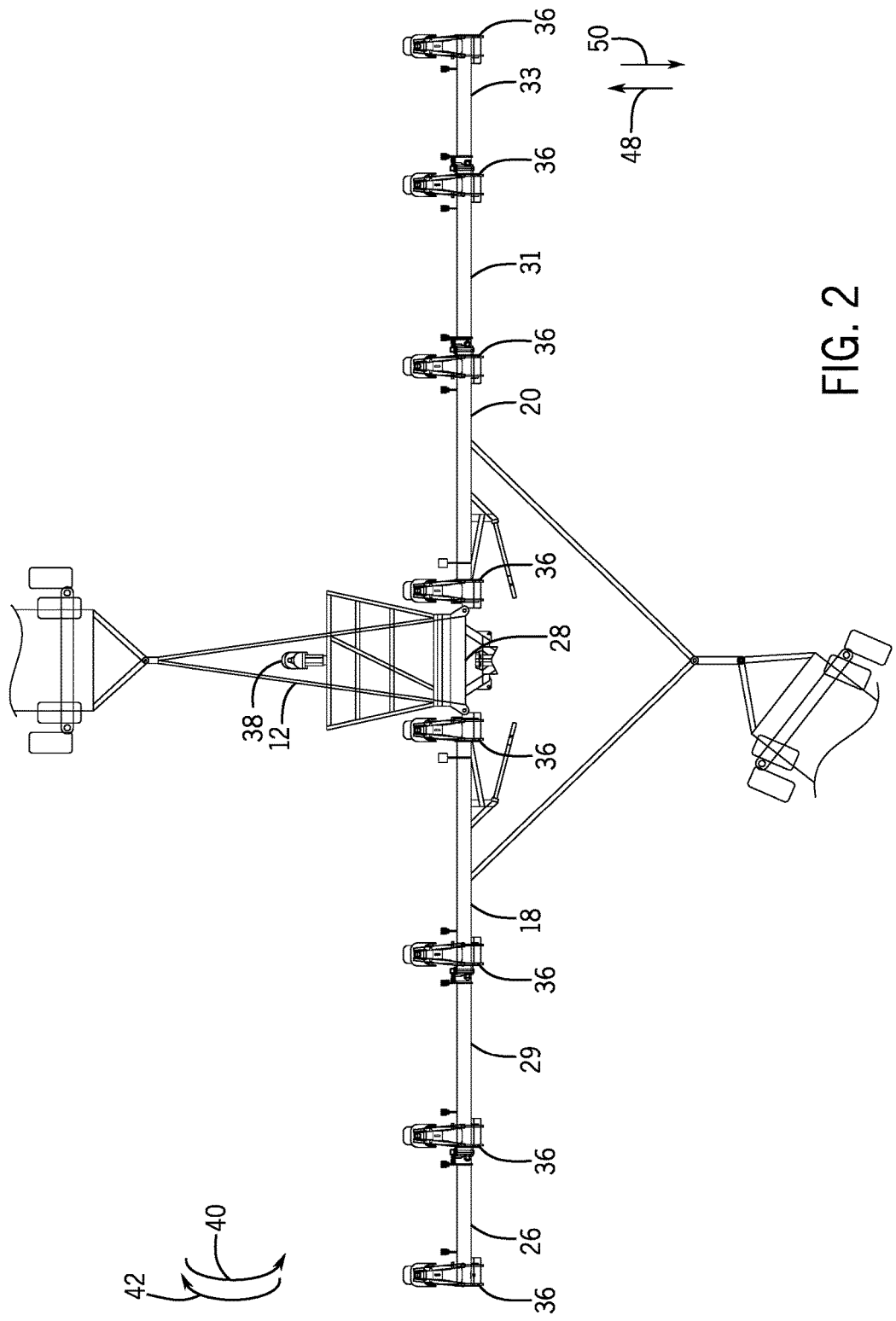
FIG. 2 is a top view of the folding implement of FIG. 1, in which the wing frames are folded upwardly.

FIG. 2 is a top view of the folding implement 10 of FIG. 1, in which the wing frames 30 are folded upwardly. In the illustrated embodiment, the center frame 58 does not rotate upwardly with the wing frames 30. As illustrated, the cart 16 is coupled to the first wing tool bar 18 and the second wing tool bar 20 by the first cart support arm 22, the second cart support arm 24, and the cart arm 54, although the cart arm 54 may be omitted in certain embodiments. In addition, the wheel assemblies 36 support the wing tool bars and the center tool bar 28.

To transition the wing frames 30 from the working position to the illustrated folded transport position, hydraulic pressure is applied to actuators, which retract respective piston rods, thereby causing the wing frames 30 to rotate in the upward direction 40 toward a location over the wing tool bars. In addition, to transition the wing frames 30 from the folded transport position to the working position, hydraulic pressure is applied to actuators, which extends the piston rods, thereby causing the wing frames 30 to rotate in a downward direction 42 toward the working position shown in FIG. 1. Additionally, position sensors may provide feedback to a controller regarding the position of the actuators, row units, and/or wing frames 30. Once the wing frames 30 are in the folded transport position, the tool bars may be rotated in the rearward direction 44 to the transport portion. The vertical orientation of the wing frames 30 enables the implement to be folded into a narrow configuration, which facilitates greater maneuverability.

Figure 3:
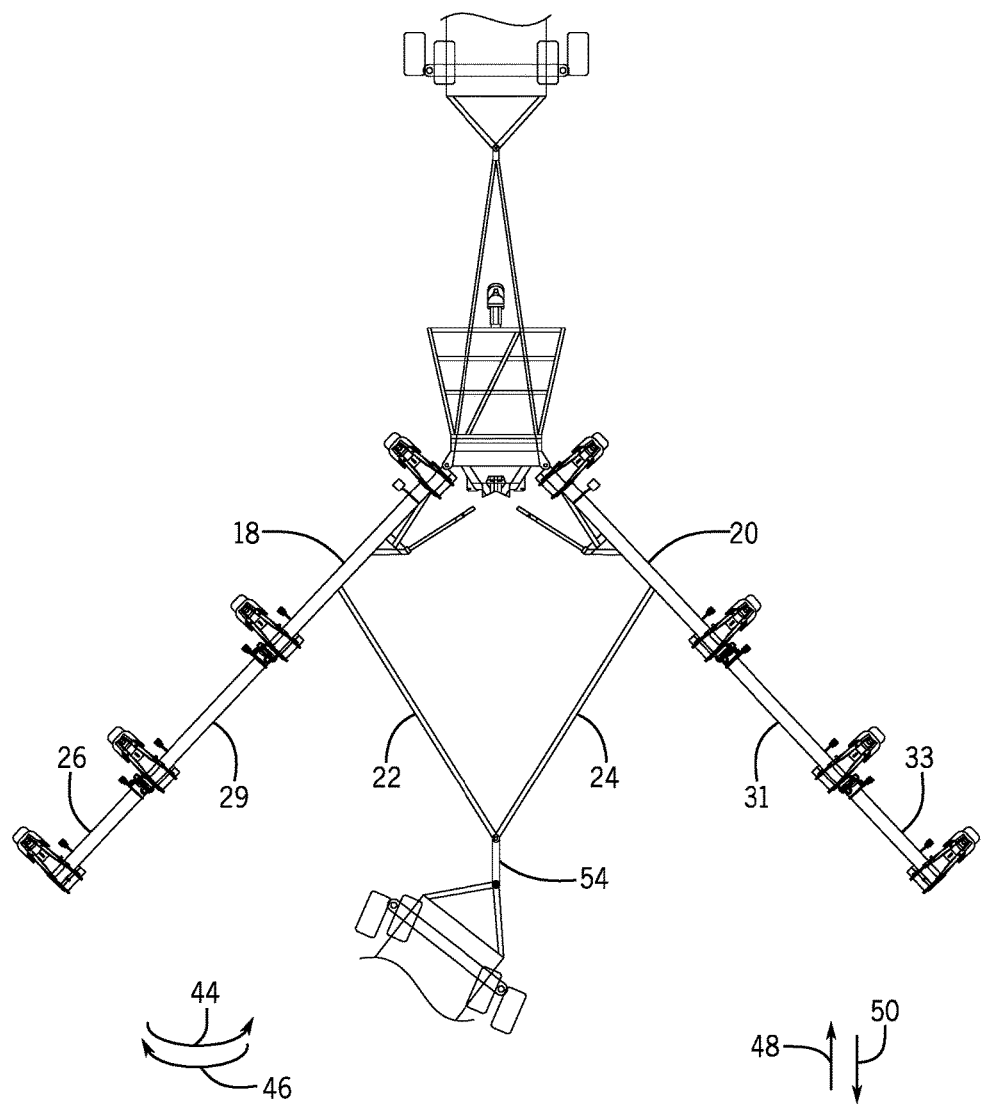
FIG. 3 is a top view of the folding implement of FIG. 1, in which the wing tool bars are partially folded in a rearward direction.

FIG. 3 is a top view of the folding implement of FIG. 1, in which the wing tool bars are partially folded in the rearward direction. In order for the implement 10 to move into this position, the wing frames 30 are folded above the wing tool bars. Then, wheel assemblies 36 are angled (e.g., via hydraulic actuator, by enabling castering, etc.) to enable each wing of the implement 10 to rotate rearwardly. The work vehicle 14 moves in a direction of travel 48. This forward motion, combined with the drag on the implement 10 causes the wing tool bars to rotate in the rearward direction 44 into the position shown. In certain embodiments, the wing tool bars may be rotated by actuators (e.g. hydraulic actuators, pneumatic actuators, etc.) toward the folded transport position.

Additionally, as the wing tool bars rotate in the rearward direction 44, the cart 16 is pushed in the rearward direction 50, opposite the direction of travel 48, relative to the center tool bar 28. The cart 16 is pushed opposite the direction of travel 48 because the first cart support arm 22 and the second cart support arm 24 remain substantially rigid and drive the cart rearwardly as the wing tool bars fold. Accordingly, as the wing tool bars rotate in the rearward direction 44, the second ends of the first and second cart support arms also move in a rearward direction 50, opposite the direction of travel 48, and push the cart 16 rearwardly.

Figure 4:
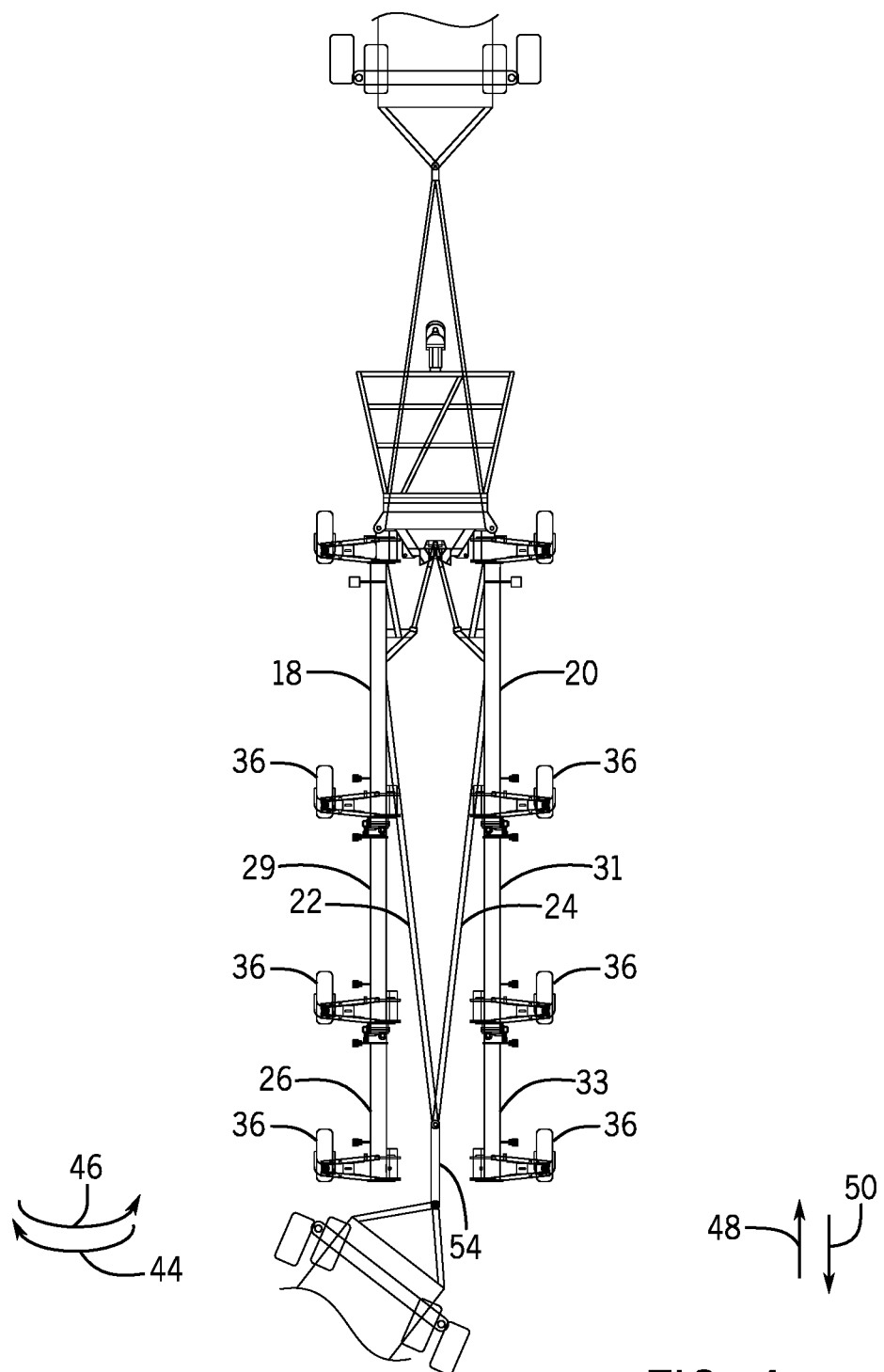
FIG. 4 is a top view of the folding implement of FIG. 1, in which the wing tool bars are fully folded in the rearward direction.

FIG. 4 is a top view of the folding implement 10, of FIG. 1, in which the wing tool bars are fully folded in the rearward direction, such that the implement is in a folded transport position. As illustrated, the cart 16 is shown connected to the implement 10 via the first cart support arm 22, the second cart support arm 24, and cart arm 54. The wing frames 30 are folded above the wing tool bars 18. The wheel assemblies 36 support the wing tool bars, and carry the load of the wing frames 30. In addition, the wheel assembly 38 supports the center section.

Furthermore, as previously discussed, as the wing tool bars rotate rearwardly, the first cart support arm 22 and the second cart support arm 24 push the cart 16 in a rearward direction 50, opposite the direction of travel 48. As shown in FIG. 4, when in the folded transport position, the cart 16 is positioned such that the cart 16 is located behind the most rearward point of the additional wing tool bars. Driving the cart 16 rearwardly via the cart support arms enables the folded width of the implement to be reduced, as compared to a configuration in which the air cart is positioned between the wing tool bars. In addition, the length of the lines that transfer product from the cart 16 to the implement 10 may be shorter, as compared to a configuration in which the air cart is positioned a fixed distance behind rearward folding tool bars (i.e., a fixed distance sufficient to enable the tool bars to fold rearwardly without contacting the air cart). As a result, the losses experienced through the lines may be significantly reduced, thereby increasing efficiency of the pneumatic conveying system of the air cart.

Figure 5:
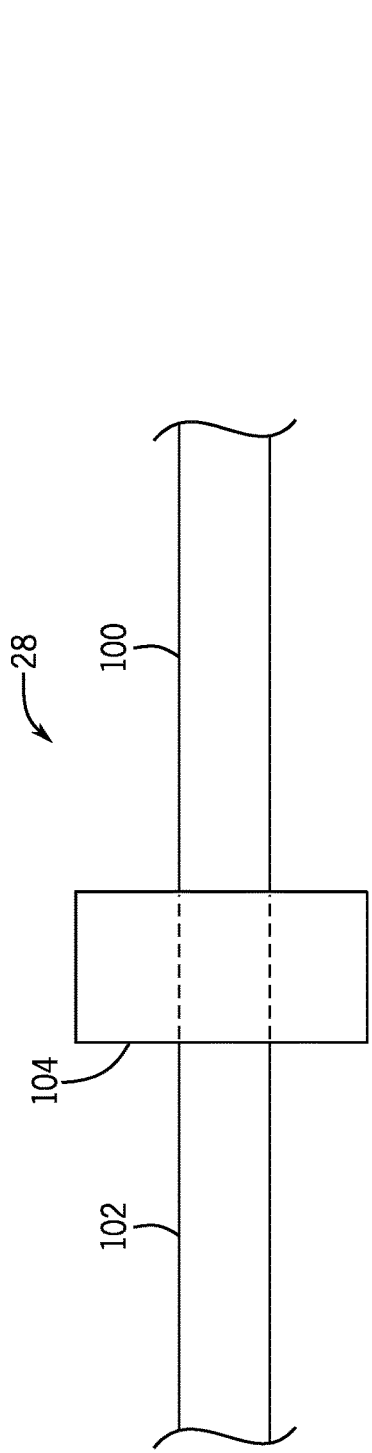
FIG. 5 is a top view of an embodiment of a locking mechanism that may be employed within the folding implement of FIG. 1.

FIG. 5 is a top view of an embodiment of a locking mechanism that may be employed within the folding implement of FIG. 1. The locking mechanism 28 includes a center bar 100, which is part of the center frame 58, a wing bar 102, which is part of one of the wing frames 30, and a locking element 104 that selectively couples the center bar 100 and the wing bar 102 to one another. The locking element 104 is configured to block the innermost wing frames 30 and the wing tool bars from rotating in the rearward direction 44 or in a forward direction 46 relative to the center tool bar/center tool frame. Any suitable type of locking element may be utilized. While the illustrated embodiment includes a U-connector, it is imagined that the locking element 104 may include a latch, a pin and hole, a U-lock, an electromagnet, a U-joint, etc. Further the locking element 104 is configured to couple the center bar 100 to wing bar 102 while the wing frames 30 are in the working position. As discussed previously, the center frame 58 does not rotate in an upward direction 40. In the illustrated embodiment, the locking element 104 automatically disengages when the wing frame rotates upwardly. However, the locking element may be actuated in other embodiments.

Figure 6:
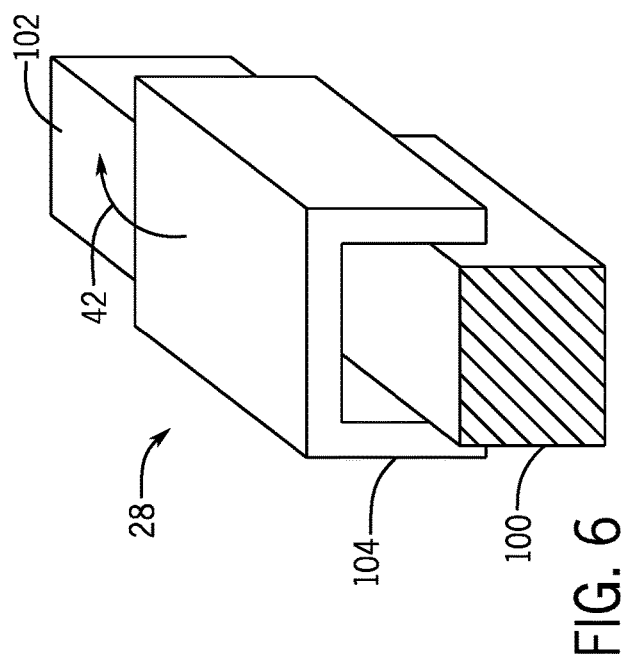
FIG. 6 is a perspective view of the locking mechanism of FIG. 5.

FIG. 6 is a perspective view of the locking mechanism 28 of FIG. 5, in which the center bar 102 is rotated slightly in an upward direction 42. In the illustrated embodiment, the locking element 104 includes a U-connector. The U-connector mechanically blocks wing bar 102, and thus wing frames 30, from rotating in the rearward direction 44 or in the forward direction 46 relative to the center bar 102. This configuration automatically engages and disengages based on the position of the wing frames 30. As the wing frames 30 are lowered into the working position, the locking element 104 automatically couples center bar 100 to wing bar 102. Likewise, when the wing frames 30 are rotated upward to the folded transport position, the locking element 104 automatically disengages from center bar 100. Further, while the present embodiment includes a locking element 104 integral with or coupled to the wing bar 102, it should be appreciated that the locking element may be integral with or coupled to the center bar 100, or the locking element may be independent of both the center bar 100 and the wing bar 102. While the illustrated locking mechanism 28 is located between the center frame and a wing frame, the locking mechanism may be employed between any two frames in an implement, such as between two wing frames.

Figure 7:
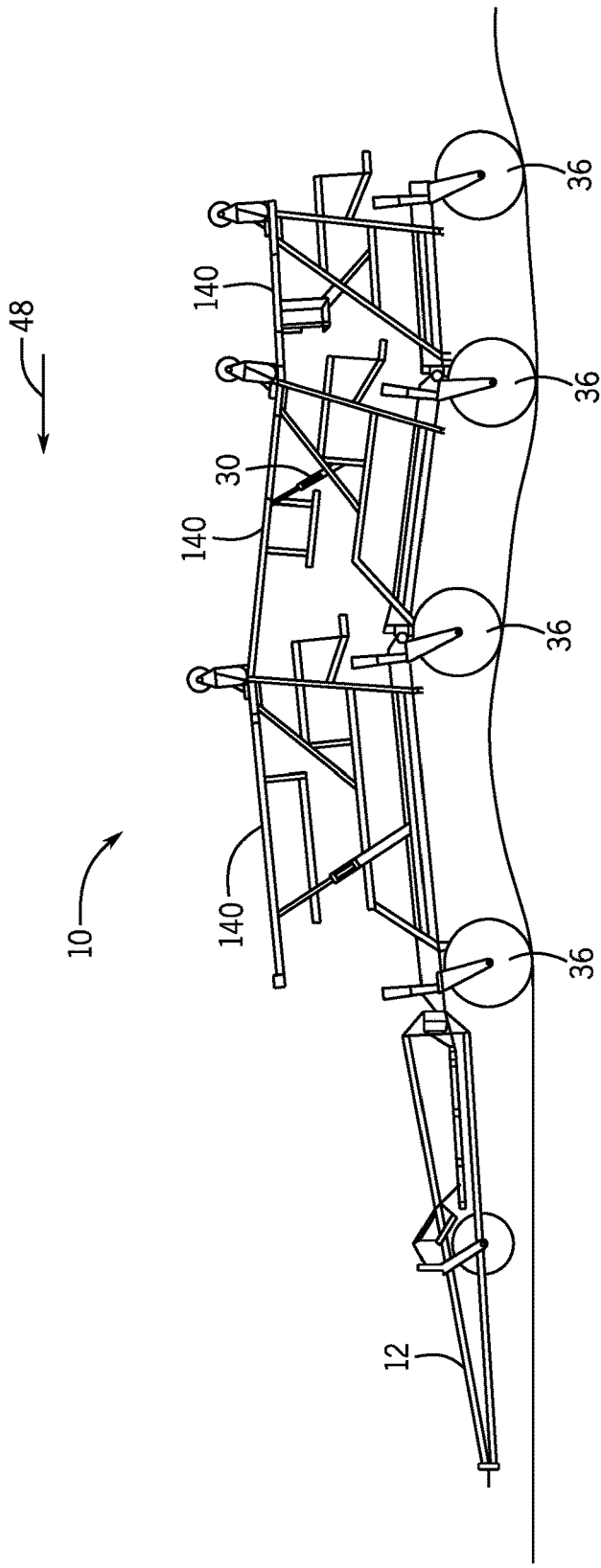
FIG. 7 is a side view of an embodiment of a folding implement including a telescoping mechanism, in which the folding implement is travelling over uneven ground.

FIG. 7 is a side view of an embodiment of a folding implement including a telescoping mechanism, in which the implement is travelling over uneven ground. As illustrated, the wing frames 30 are folded upwardly and rearwardly into the transport position. The hitch assembly 12 couples to a work vehicle 14, which pulls the implement 10 in the direction of travel 48. In the illustrated embodiment, the implement 10 includes telescoping mechanisms 140 configured to enable certain bars of wing frames 30 to move relative to one another while maintaining a connection between the bars. As a result, the wheel assemblies 36 may stay engaged with the uneven ground. In addition, when the implement 10 moves in the direction of travel 48 while in the working position, drag urges the wing frames in a rearward direction 44. Each telescoping mechanism 140 is configured to block the rearward movement of an outer wing frame and wing tool bar relative to an inner wing frame and wing tool bar.

Figure 8:
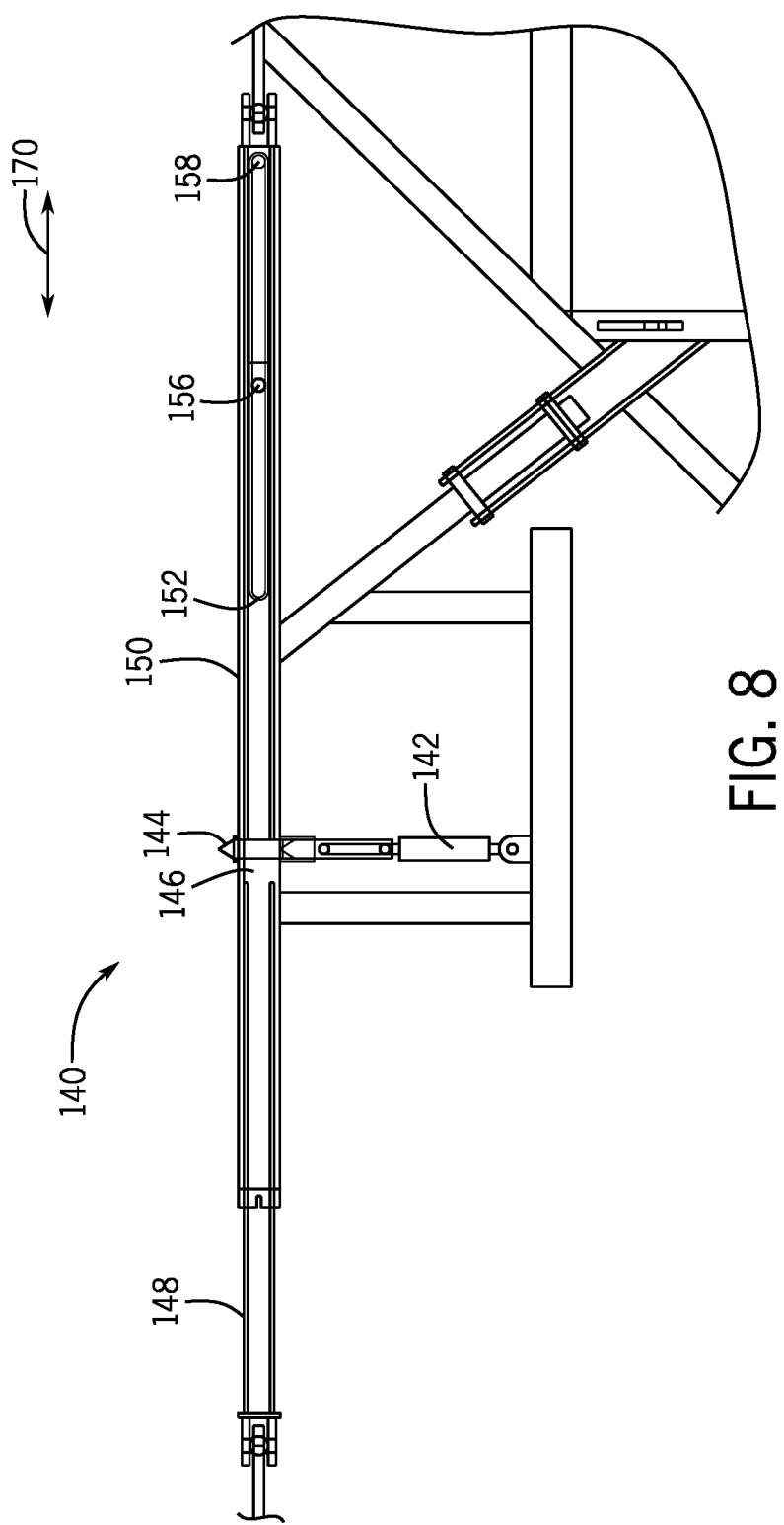
FIG. 8 is a side view of a portion of the telescoping mechanism of FIG. 7.

FIG. 8 is a side view of a portion of the telescoping mechanism 140 of FIG. 7. The telescoping mechanism 140 includes a cylinder 142 that moves a pin 144. The pin 144 selectively engages and disengages a hole 146. The pin 144 engages the hole 146 while the implement 10 is in the working position, and the pin 144 disengages the hole 146 while the implement 10 is in the transport position. When the pin 144 is engaged in the hole 146, movement of an inner member 148 relative to an outer member 150 along a lateral axis 170 is blocked. As a result, rotation of an outer wing relative to an inner wing is blocked while the implement is in a working position. Further, when the pin 144 is disengaged from the hole 146, the inner member 148 and outer member 150 are able to move along the lateral axis 170 with respect to one another, which enables the wing frames 30 to rotate relative to one another, which allows wheel assemblies 36 of implement 10 to stay in contact with the ground as the implement 10 moves along uneven terrain in the transport position, as shown in FIG. 7. In addition, inner member 148 is coupled to a joint of an inner wing frame and outer member 150 is coupled to a joint of an outer wing frame.

In the illustrated embodiment, the telescoping mechanism 140 includes a first pin 156 and a second pin 158, along with an inner loop 152 to limit the amount that inner member 148 and outer member 150 move along the lateral axis 170 with respect to one another. The first pin 156 is coupled to inner member 148 and the second pin 158 is coupled to outer member 150. In the most extended position, the first pin 156 engages a first end of the inner loop 152, and the second pin 158 engages a second end of inner loop 152, thus mechanically blocking the inner member 148 and outer member 150 from extending away from one another any farther. In the most contracted position, the first pin 156 engages the second pin 158 and the second end of the inner loop 152. The inner loop 152 may be formed from a solid or elastic material. Further, while the illustrated telescoping mechanism includes the first pin 156, the second pin 158, and the inner loop 152, it should be appreciated that in alternative embodiments, the telescoping mechanism may include any other suitable assembly that blocks the inner member 148 and the outer member 150 from extending away from one another beyond a maximum extension (e.g. physical blocks, a first pin and a second pin with no inner loop, etc.).

Figure 9:
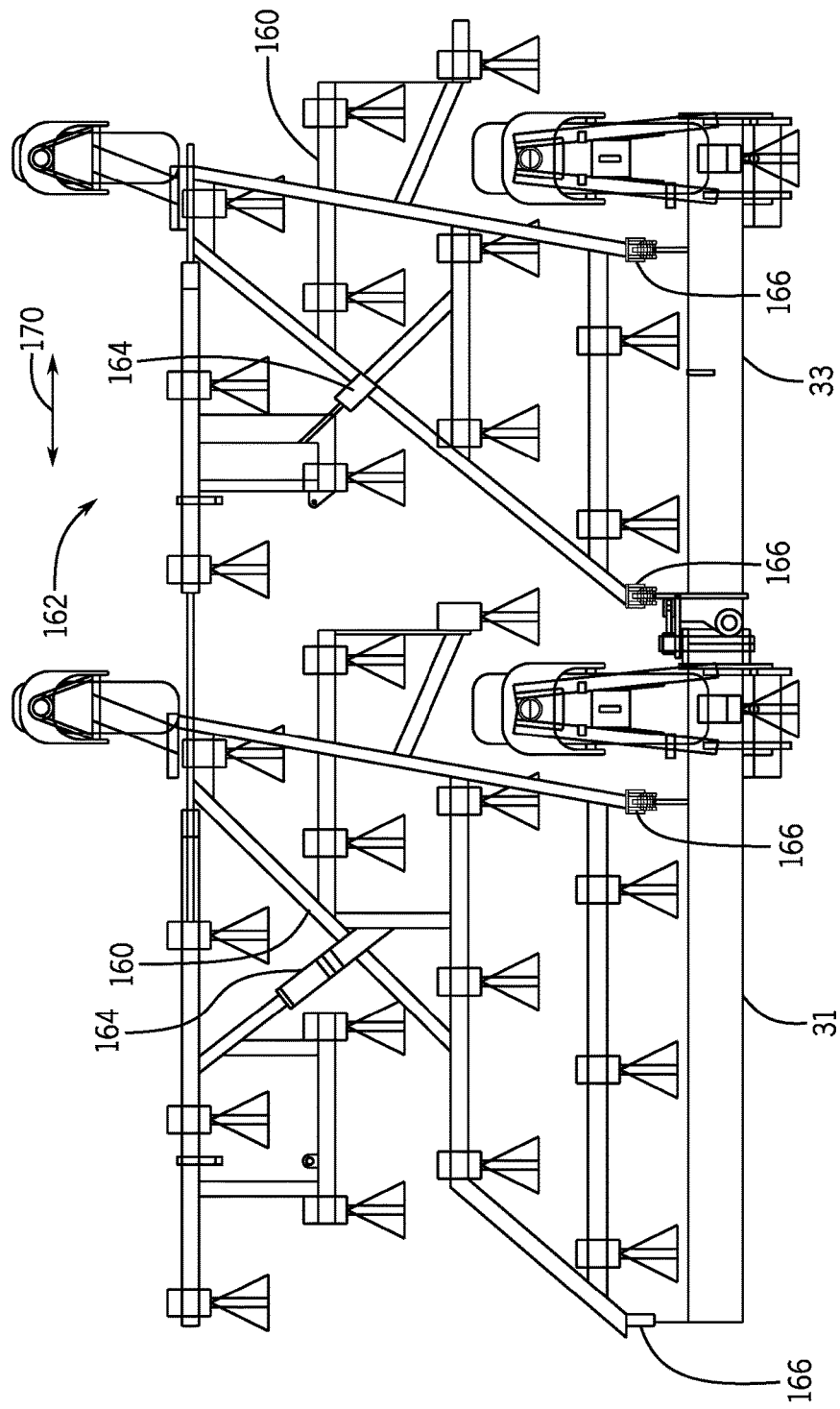
FIG. 9 is a top view of an embodiment of a wing frame having triangular frame sections.

FIG. 9 is a top view of an embodiment of a wing frame having two triangular frame sections 160. A lift cylinder 164, which is configured to move the triangular frame section 160 relative to the ground, is coupled to each triangular frame section 160. In addition, each triangular frame section 160 is pivotally coupled to another frame section at a joint 166, which creates hinge lines that are angled relative to the direction of travel. The hinge lines can be configured to be any suitable angle between about 10 degrees and 80 degrees with respect to the lateral axis 170. This coupling enables the triangular frame sections 160 to rotate in response to uneven ground while the implement is in the working position.

Figure 10:
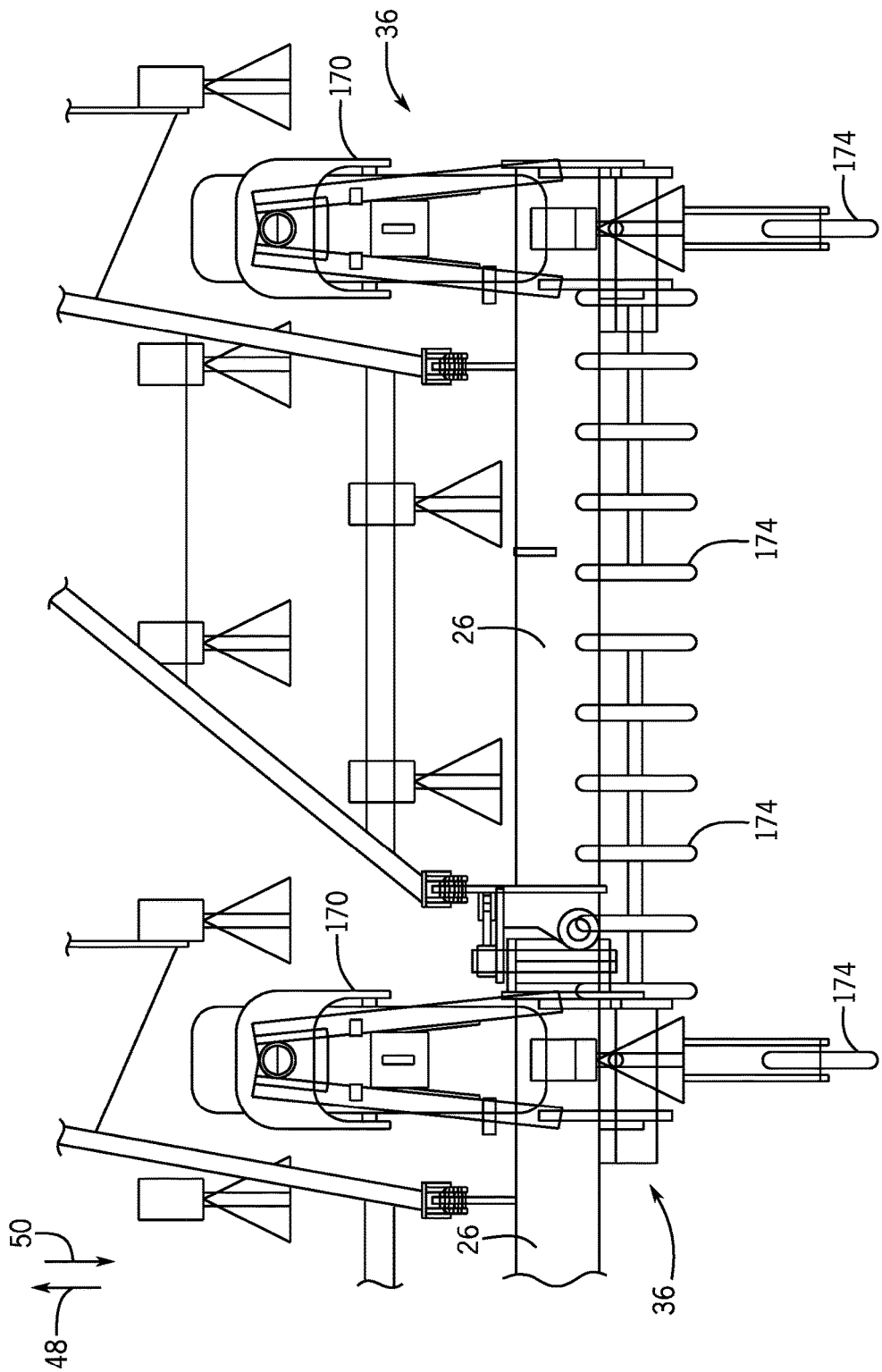
FIG. 10 is a top view of an embodiment of an implement having wheel assemblies positioned forward of a tool bar.

FIG. 10 is a top view of an embodiment of an implement having wheel assemblies positioned forward of a tool bar. When the implement 10 passes over soil and deposits seeds or other agricultural product, the soil may be compacted over the deposited seed or other agricultural product to enhance crop yields. In the illustrated embodiment, the main wheels 170, which support most of the weight of the implement 10, are coupled to and extend from the additional wing tool bars 26, 29, 31, 33, the first wing tool bar 18, and the second wing tool bar 20. In addition, the main wheels 170 extend forwardly with respect to the direction of travel 48 from the additional wing tool bars 26, 29, 31, 33 the first wing tool bar 18, and the second wing tool bar 20. Further, press wheels 174 are also coupled to the additional wing tool bars 26, 29, 31, 33 the first wing tool bar 18, and the second wing tool bar 20. Moreover, down force applied by the press wheels 174 may be adjusted by springs or hydraulics.

Figure 11:
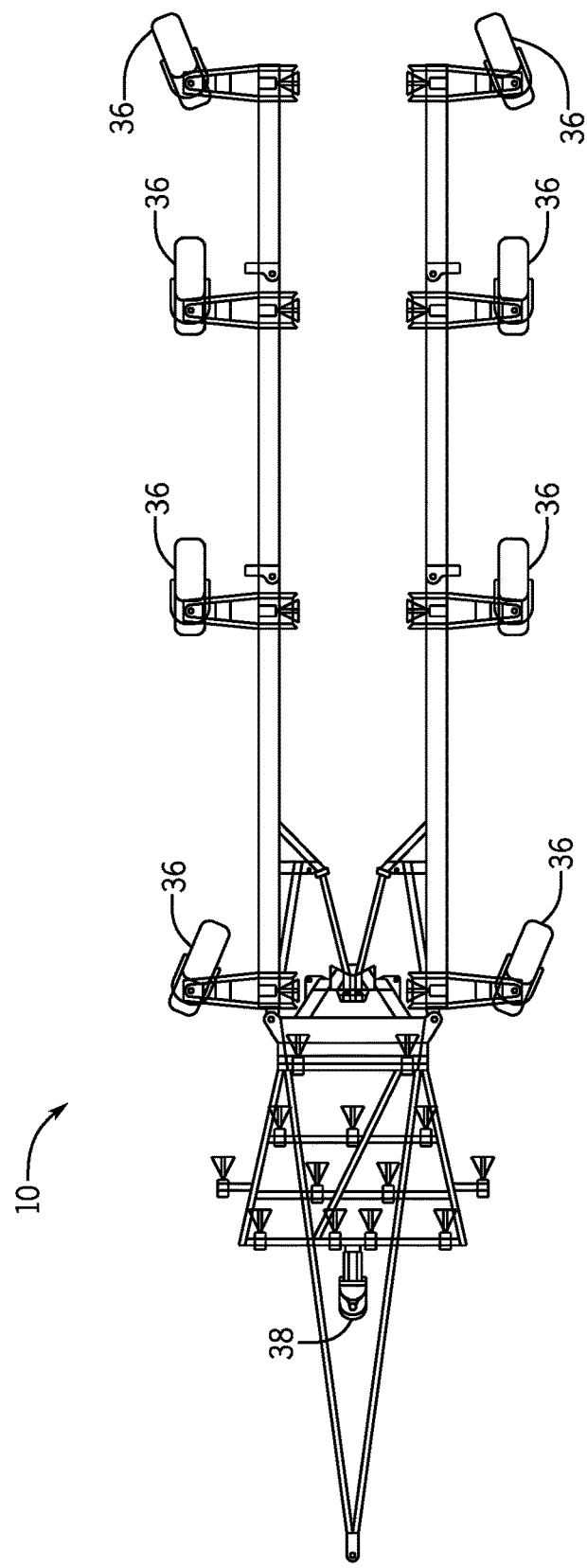
FIG. 11 is a top view of an embodiment of an implement in the transport position, in which front and rear wheel assemblies are configured to caster.

FIG. 11 is a top view of an embodiment of an implement in the transport position, in which front and rear wheel assemblies are configured to caster. Although the illustrated embodiment shows the front and the rear wheel assemblies castering, any number of wheel assemblies could caster, including none or all of the wheel assemblies. In the illustrated embodiment the front and rear wheel assemblies are castering to allow for increased handling abilities of the implement 10 when in the transport position.

Figure 12:
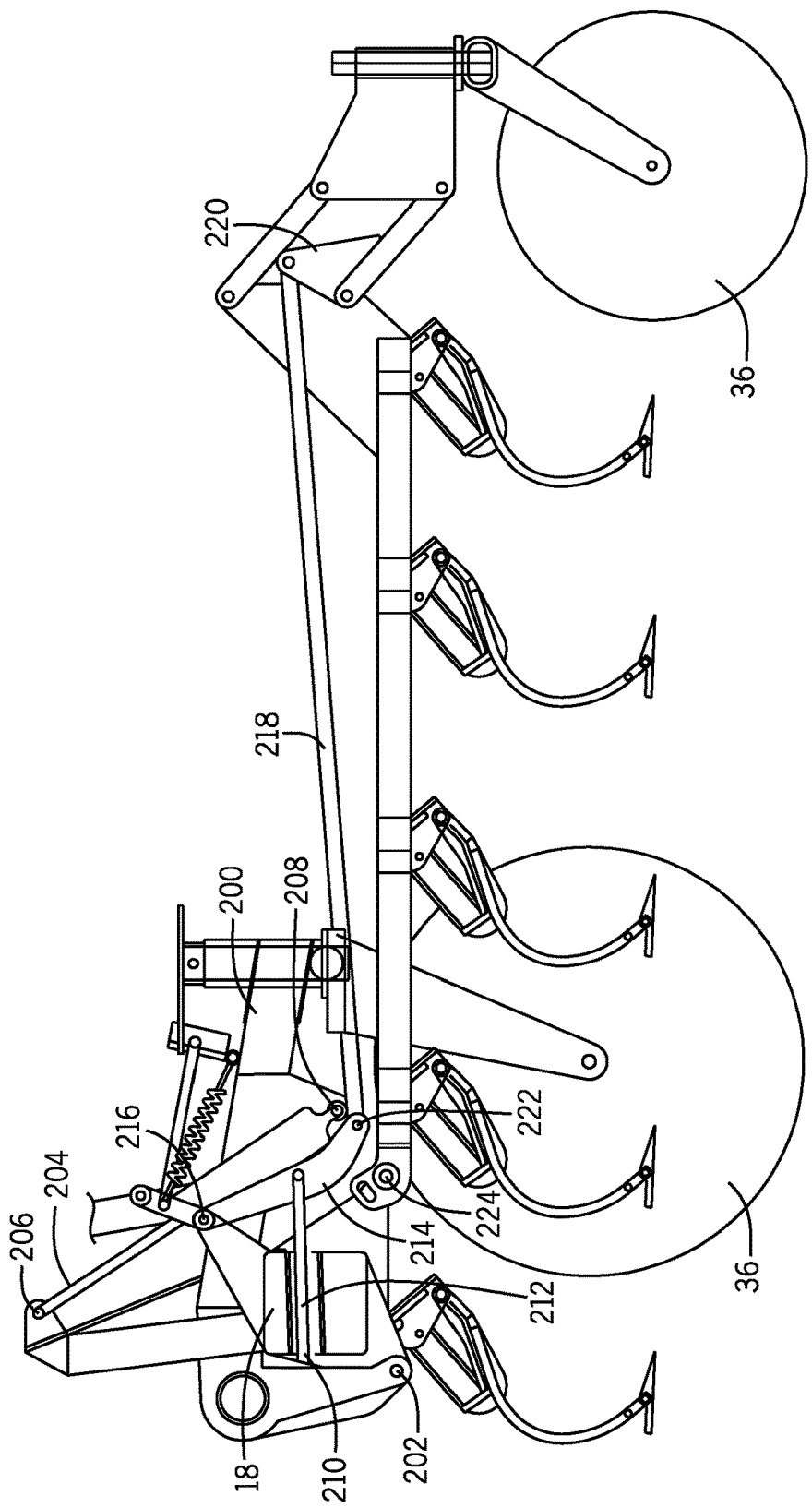
FIG. 12 is a side view of an embodiment of a wheel assembly configured to caster that may be employed within the implement of FIG. 11.

FIG. 12 is a side view of an embodiment of a wheel assembly configured to caster that may be employed within the implement of FIG. 11. A wheel standard 200 mounts to the first wing tool bar 18 at joint 202; however, the wheel standard 200 may mount to any suitable tool bar, including the center tool bar 28, the second wing tool bar 20, or the additional wing tool bars 26, 29, 31, 33. A cylinder 204 mounts to the first wing tool bar 18 at joint 206 and to the wheel standard 200 at joint 208. Extension and retraction of cylinder 204 provides motion to the rear wheel assembly 36. A pivot 210 operates a link 212, which extends through a port in the first wing tool bar 18 to operate an arm 214, which pivots on a pin 216 that is pivotally coupled to the first wing tool arm 18. A link 218 connects the arm 214 with the caster arm 220 at the front of the implement, giving synchronized and equal lift to both front and rear of the machine. This structure enables the pivot point 222 to remain close to the pivot point 224 about which the wing frame 30 rotates while following terrain.

Figure 13:
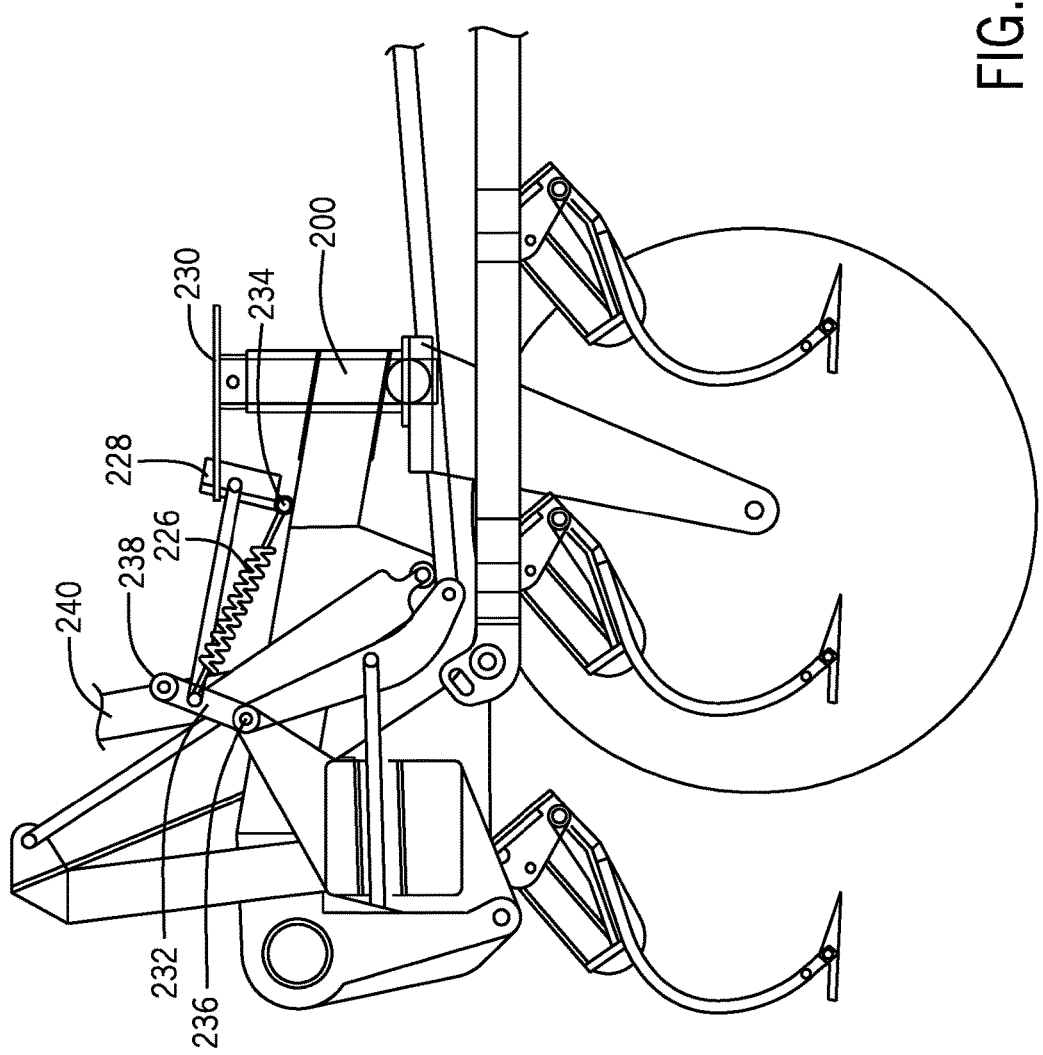
FIG. 13 is a side view of the wheel assembly configured to caster of FIG. 12, in which castering of the wheel assembly is blocked.

FIG. 13 is a side view of the wheel assembly configured to caster of FIG. 12, in which castering of the wheel assembly is blocked. A spring 226 holds a lug 228, which is coupled to the wheel standard 200 at a joint 234, in position in a notch in a caster top plate 230, thereby blocking rotation. A lever 232, which is pivotally coupled to the wheel standard 200 at joint 236, includes a roller 238 at the top. The roller 238 contacts the wing 240 when going into the transport position, and swings backward to remove lug 228 from the notch, and wheel assembly 36 is free to caster. When the wing frames 30 are in the transport position, the wheel assemblies 36 are able to caster, and when the wing frames 30 are in a working position, the wheel assemblies cannot caster and are locked in place. However, this only applies to the wheel assemblies with the castering mechanism.

Figure 14:
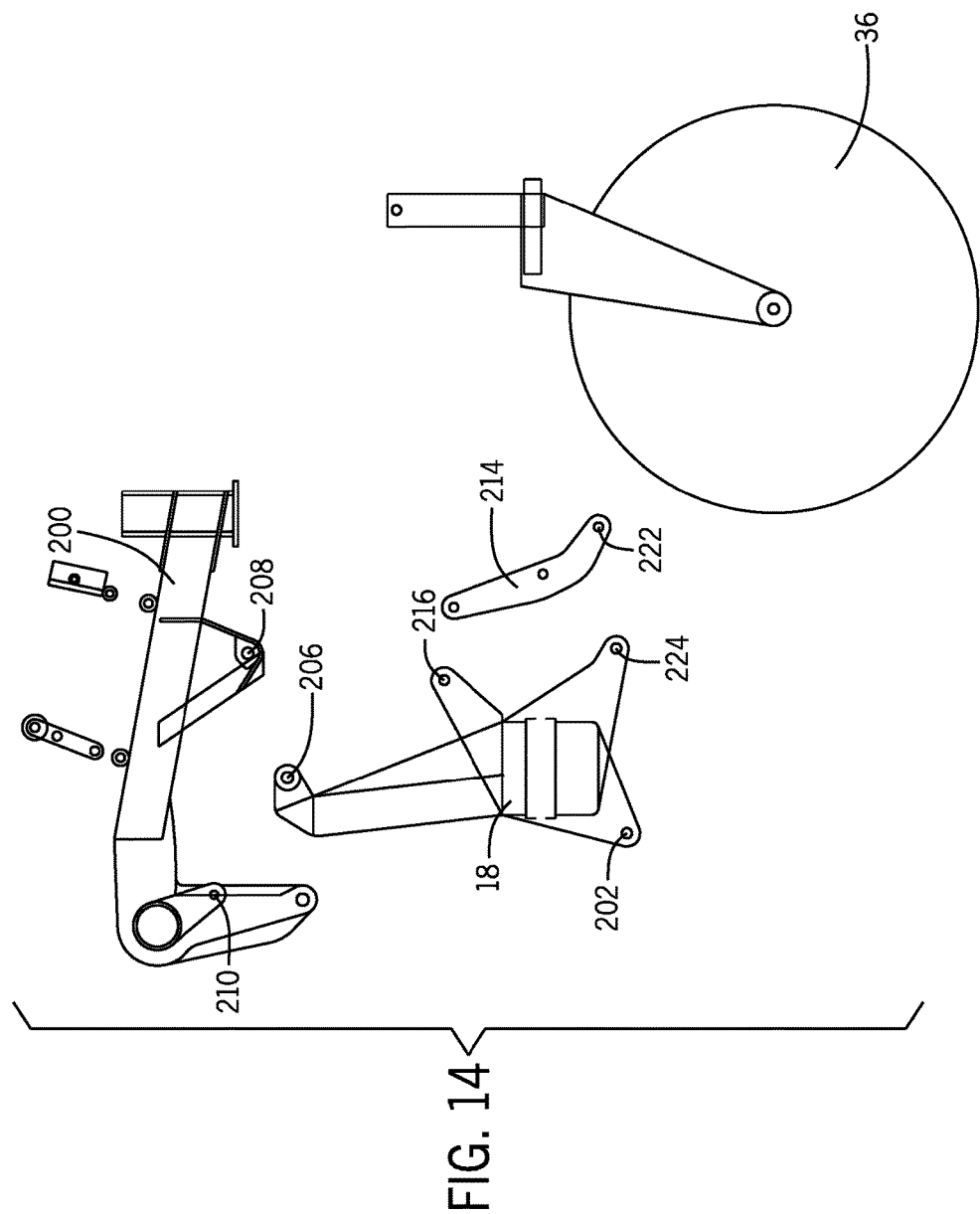
FIG. 14 is an exploded view of a portion of the wheel assembly of FIG. 12.

FIG. 14 is an exploded view of a portion of the wheel assembly of FIG. 12.

Figure 15:
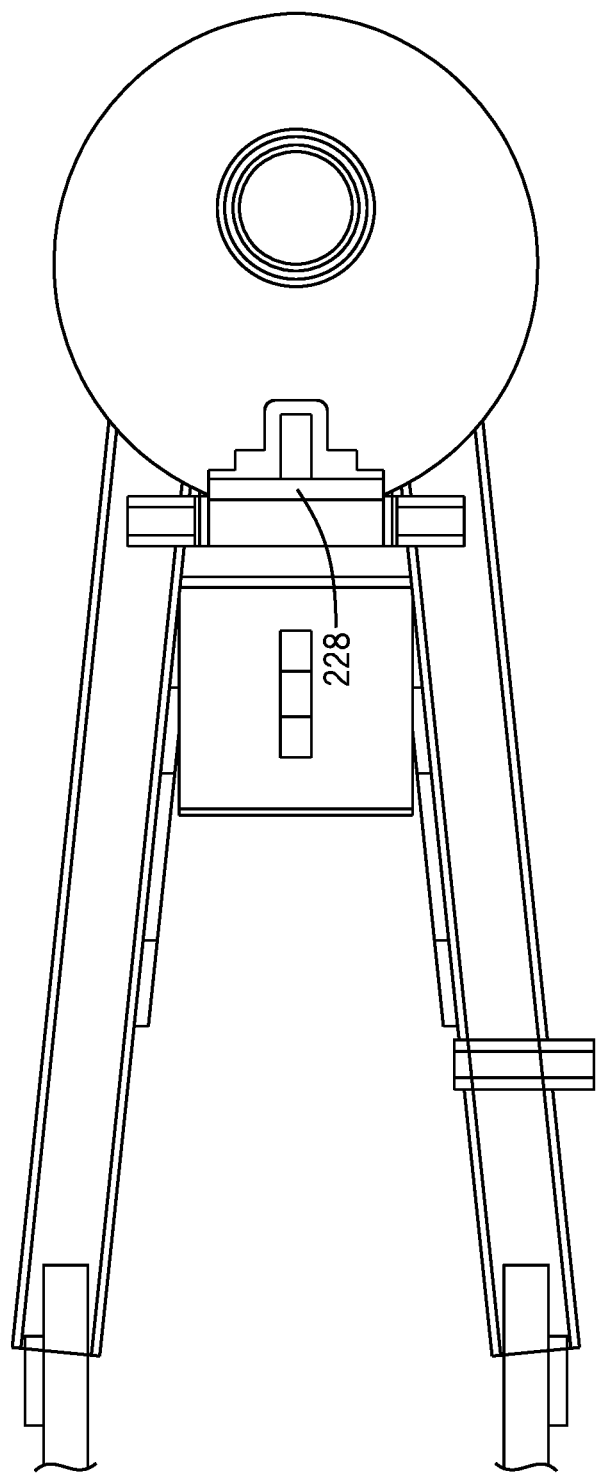
FIG. 15 is a top view of an embodiment of a locking assembly that may be employed within the wheel assembly of FIG. 12 to block castering of the wheel assembly.

FIG. 15 is a top view of an embodiment of a locking assembly that may be employed within the wheel assembly of FIG. 12 to block castering of the wheel assembly.

Figure 16A:
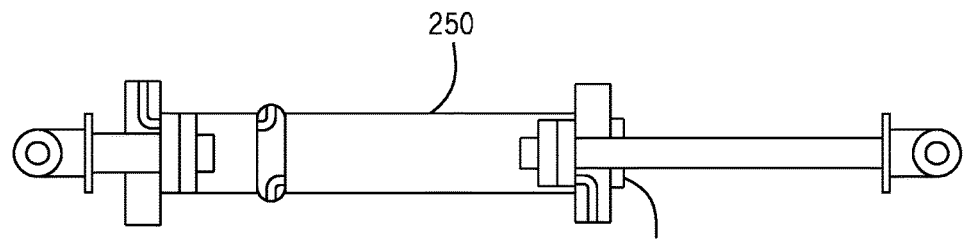
FIGS. 16A-16C are side views of elements of an embodiment of a hydraulic wheel caster system that may be employed within the wheel assembly configured to caster of FIG. 13.
Figure 16B:
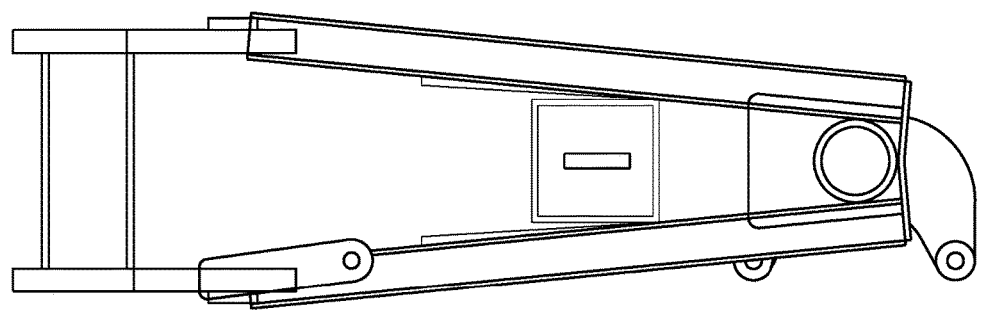
Figure 16C:
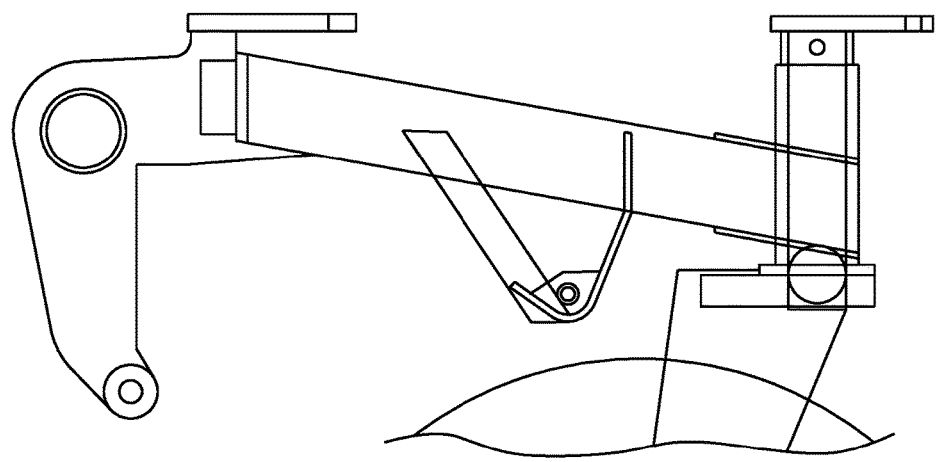

FIGS. 16A-16C are side views of elements of an embodiment of a hydraulic wheel caster system that may be employed within the wheel assembly configured to caster of FIG. 13. Raising the wing frames to the folded transport position unlocks the caster feature of wheel assemblies, as described above. Hydraulic pressure is directed to the chamber of a cylinder 250. Wheels are first turned slightly to align with the vertical knuckle pivot to smoothly swing the tool bar back to the transport position. As there may be three wing sizes, there may be three different angles established to correctly track the wheel, 8, 10, and 12 degrees. This is accomplished as follows. The cylinder 41 is constructed with a gland fitting and rod and piston on each end, each with its own section of barrel There is a casting located between these separate barrels that has two ports, so each section has its own delivery port. Two spacers 42 are placed on the rods to control stroke. In the three wing sizes, depending on wing size, spacers are both on the short stroke end, or, one on each shaft, or, both on the long stroke end. In this way, total stroke is the same, to move the wheel 90 degrees, but the ratio varies. Hydraulic fluid is delivered to the short stroke end, and this correctly positions the wheel for rotation to transport. In the last bit of motion, a valve shunts and the long stroke end is activated, completing the motion of the wheel into the transport position. The opposite happens going back to the working position.

To give controlled and level lifting to the machine, there are at least two options: a master slave system, which would be enhanced and simplified by joining the wheel standards on each of the inner wings with a rockshaft, so one less stage in the master/slave may be included, or electronic position control cylinders.

There are at least two possibilities for the operation of the front center caster. One is to have a link from the main wheel standards on each side operate the front caster. (This can be one in the center front as shown in FIG. 1, or one on either side.) As pitch undulation may be different from each side, there may be a short evener link in the system to accommodate the individual motion of the wing tool bar mounted wheel standards while in the transport position. In another embodiment, the hitch contacts and lifts the center tool frame at headlands and during transport. A depth stop system may position the front caster at the correct depth set by the rest of the system. This eliminates any linkages from the rear wheel standards and provides adequate clearance in the transport position. The implement may not he able to be backed up while the ground-engaging tools are in the ground, and when raised the front center caster is airborne, so no space is required for its complete rotating.

Figure 17:
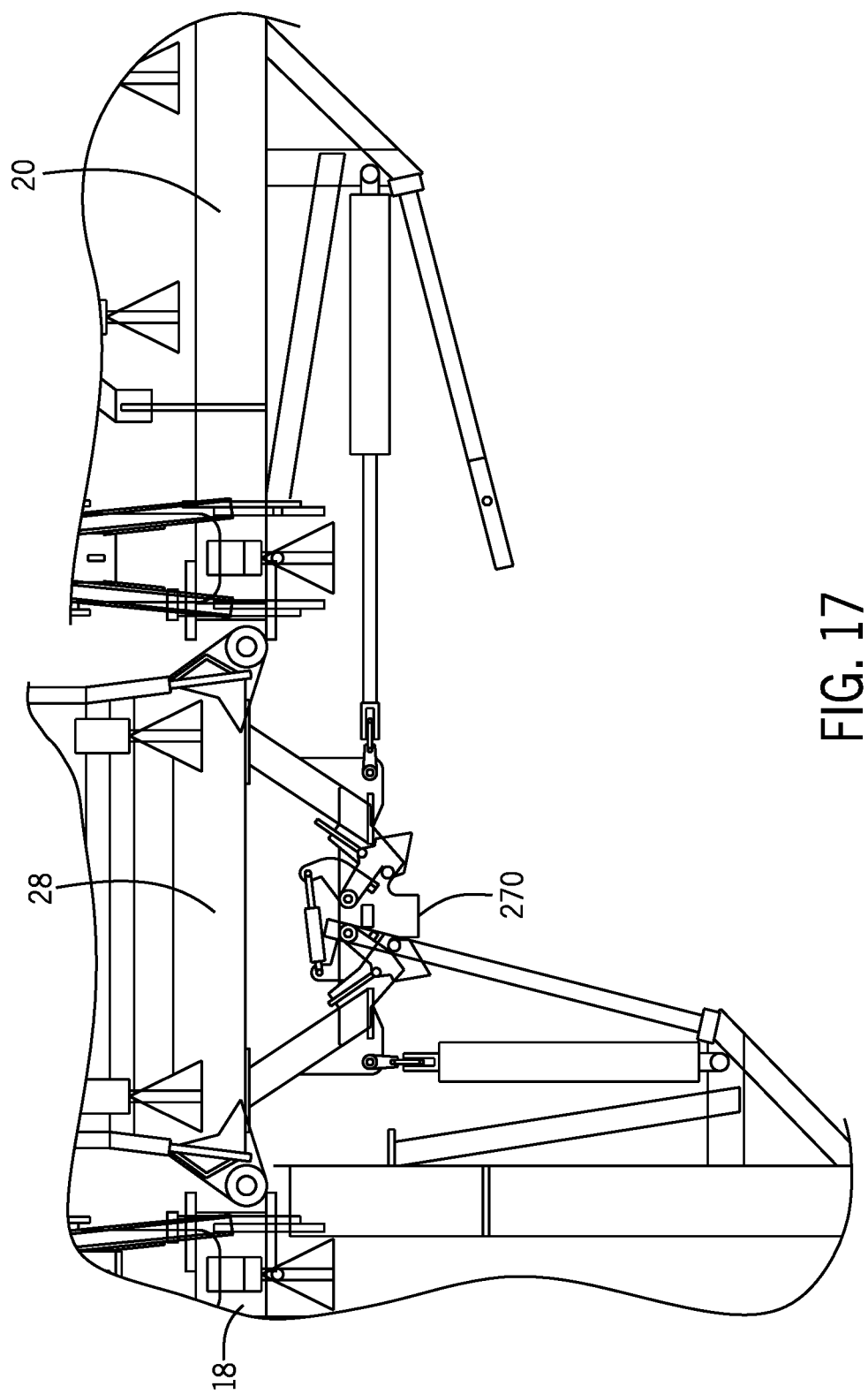
FIG. 17 is a top view of an embodiment of a wing locking system configured to selectively lock wings in the transport position.

FIG. 17 is a top view of a locking mechanism 270 that locks the first wing tool bar 18 to the second wing tool bar 20 when the implement is in the transport position. A locking mechanism 270 is used to block the first wing tool bar 18 and the second wing tool bar 20 from rotating forwardly while the implement is in the transport position. Any suitable locking mechanism may be used in place of locking mechanism 270. While the illustrated embodiment includes a latch, the locking mechanism 270 may include a U-connecter, a pin and hole, a U-lock, an electromagnet, a U-joint, etc.

Further, while the locking mechanism 270 locks the first wing tool bar 18 to the second wing tool bar 20, it should be appreciated that the locking mechanism 270 could lock any combination of wing tool bars to each other.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural implement system, comprising:
  a center frame comprising a center bar;
  a first wing frame comprising a wing bar, wherein the first wing frame is configured to rotate about a vertical axis relative to the center frame;
  a second wing frame;
  a telescoping mechanism;
  wherein the telescoping mechanism is configured to couple the first and second wing frames to one another and to selectively enable articulation of the second wing frame relative to the first wing frame while the first and second wing frames are in a raised transport position; and
  a locking mechanism configured to lock the center bar to the wing bar, and the locking mechanism is configured to unlock the center bar from the wing bar to facilitate rotation of the first wing frame about the vertical axis relative to the center frame.

2. The agricultural implement system of claim 1, wherein the telescoping mechanism is configured to block articulation of the second wing frame relative to the first wing frame in response to insertion of a pin into an insertion point on the first wing frame, and to facilitate articulation in response to removal of the pin from the insertion point on the first wing frame.

3. The agricultural implement system of claim 1, wherein the center frame is configured to remain in the working position while the first wing frame is rotated upwardly.

4. The agricultural implement system of claim 1, wherein the locking mechanism is configured to lock the center bar to the wing bar by a U-connector.

5. The agricultural implement system of claim 4, wherein the locking mechanism is configured to unlock the center bar from the wing bar in response to upward rotation of the first wing frame.

6. The agricultural implement system of claim 4, wherein the locking mechanism is configured to automatically lock when the first wing frame rotates downwardly.

7. The agricultural implement system of claim 1, wherein the locking mechanism is configured to automatically unlock when the first wing frame rotates upwardly.

8. An agricultural implement system, comprising:
  a center frame comprising a center bar;
  a first wing frame comprising a first wing bar, wherein the first wing frame is configured to rotate about a vertical axis relative to the center frame;
  a second wing frame comprising a second wing bar, wherein the second wing frame is configured to rotate about a vertical axis relative to the center frame, and wherein the first wing frame and second wing frame are disposed on opposite lateral sides of the center frame;
  a third wing frame;
  a fourth wing frame;
  a first telescoping mechanism;
  a second telescoping mechanism;

wherein the first telescoping mechanism is configured to couple the first and third wing frames to one another and to selectively enable articulation of the third wing frame relative to the first wing frame while the first and third wing frames are in a raised transport position; and wherein the telescoping mechanism is configured to couple the second and fourth wing frames to one another and to selectively enable articulation of the fourth wing frame relative to the second wing frame while the second and fourth wing frames are in a raised transport position;

a first locking mechanism that is configured to lock the center bar to the first wing bar, and the first locking mechanism is configured to unlock the center bar from the first wing bar to facilitate rotation of the first wing frame about the vertical axis relative to the center frame; and a second locking mechanism that is configured to lock the center bar to the second wing bar, and the second locking mechanism is configured to unlock the center bar from the second wing bar to facilitate rotation of the second wing frame about the vertical axis relative to the center frame.

9. The agricultural implement system of claim 8, wherein the first telescoping mechanism is configured to block articulation of the third wing frame relative to the first wing frame in response to insertion of a first pin into a first insertion point on the first wing frame, and to facilitate articulation in response to removal of the first pin from the first insertion point on the first wing frame; and wherein the second telescoping mechanism is configured to block articulation of the fourth wing frame relative to the second wing frame in response to insertion of a second pin into a second insertion point on the second wing frame, and to facilitate articulation in response to removal of the second pin from the second insertion point on the second wing frame.

10. The agricultural implement system of claim 8, wherein the center frame is configured to remain in the working position when the first or the second wing frame is rotated upwardly.

11. The agricultural implement system of claim 8, wherein both the first and second locking mechanisms are configured to lock the center bar to the respective wing bar by a U-connector.

12. The agricultural implement system of claim 8, wherein both the first and second locking mechanisms are configured to automatically unlock when the respective wing frame rotates upwardly.

13. An agricultural implement system, comprising:
a center frame comprising a center bar;
a first wing frame comprising a wing bar, wherein the first wing frame is configured to rotate about a vertical axis relative to the center frame;
a second wing frame;
a telescoping mechanism;
wherein the telescoping mechanism is configured to couple the first and second wing frames to one another and to selectively enable articulation of the second wing frame relative to the first wing frame while the first and second wing frames are in a raised transport position; and
a locking mechanism configured to lock the center bar to the wing bar, and the locking mechanism is configured to unlock the center bar from the wing bar to facilitate rotation of the first wing frame about the vertical axis relative to the center frame, and wherein the center bar is the most forward lateral bar of the center frame relative to the direction of travel, and the wing bar is the most forward lateral bar of the first wing frame relative to the direction of travel.

14. The agricultural implement system of claim 13, wherein the telescoping mechanism is configured to block articulation of the second wing frame relative to the first wing frame in response to insertion of a pin into an insertion point on the first wing frame, and to facilitate articulation in response to removal of the pin from the insertion point on the first wing frame.

15. The agricultural implement system of claim 13, wherein the center frame is configured to remain in the working position when the first wing frame is rotated upwardly.

16. The agricultural implement system of claim 13, wherein the locking mechanism is configured to lock the center bar to the wing bar by a U-connector.

17. The agricultural implement system of claim 16, wherein the locking mechanism is configured to automatically unlock when the first wing frame rotates upwardly.

* * * * *